(12) United States Patent
Li

(10) Patent No.: US 8,676,754 B2
(45) Date of Patent: Mar. 18, 2014

(54) METHOD AND APPARATUS FOR DATA DISASTER TOLERANCE PREPROCESSING, AND SERVICE CONTROL POINT

(75) Inventor: Weihao Li, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 56 days.

(21) Appl. No.: 13/502,955

(22) PCT Filed: May 24, 2010

(86) PCT No.: PCT/CN2010/073157
§ 371 (c)(1),
(2), (4) Date: Apr. 19, 2012

(87) PCT Pub. No.: WO2010/145414
PCT Pub. Date: Dec. 23, 2010

(65) Prior Publication Data
US 2012/0209807 A1    Aug. 16, 2012

(30) Foreign Application Priority Data
Oct. 20, 2009  (CN) .......................... 2009 1 0179895

(51) Int. Cl.
*G06F 17/30*    (2006.01)
(52) U.S. Cl.
USPC ......................................... 707/620; 707/626
(58) Field of Classification Search
CPC .................. G06F 17/30575; G06F 17/30578; G06F 17/30581

USPC ................................... 707/610–626, 633–643
See application file for complete search history.

(56) References Cited

U.S. PATENT DOCUMENTS

| 6,311,186 B1* | 10/2001 | MeLampy et al. ..................... 1/1 |
| 2007/0183347 A1* | 8/2007 | Gu et al. ......................... 370/258 |
| 2008/0154850 A1* | 6/2008 | Evans et al. ....................... 707/3 |
| 2008/0285438 A1* | 11/2008 | Marathe et al. ............... 370/220 |

FOREIGN PATENT DOCUMENTS

| CN | 1264518 A | 8/2000 |
| CN | 101266606 A | 9/2008 |

OTHER PUBLICATIONS

Wang, H et al. Design of Disaster Tolerant Solution of Intelligent Network. Journal of Beijing University of Posts and Telecommunications. Apr. 2004, vol. 27, No. 2, pp. 88-92.

* cited by examiner

*Primary Examiner* — Wilson Lee
(74) *Attorney, Agent, or Firm* — McGarry Bair PC

(57) ABSTRACT

The present invention discloses a method and an apparatus for data disaster tolerance preprocessing and a Service Control Point (SCP), the method and the apparatus are used in each SCP of a plurality of SCPs with databases, the method comprises: setting a first database in a first SCP, wherein the first database is used to perform disaster tolerance backup for a second database in a second SCP. Through the present invention, the cost of the construction of the system is reduced, and the stability and feasibility of a disaster tolerance system are enhanced.

8 Claims, 2 Drawing Sheets

METHOD AND APPARATUS FOR DATA DISASTER TOLERANCE PREPROCESSING, AND SERVICE CONTROL POINT

CROSS-REFERENCE TO RELATED APPLICATIONS

This application is a National Phase application of International Application No. PCT/CN2010/073157, filed May 24, 2010, which claims the benefit of Chinese Patent Application No. 200910179895.9, filed Oct. 20, 2009, both of which are incorporated herein by reference in their entirety.

FIELD OF THE INVENTION

The present invention relates to the field of communication, and in particular to a method and an apparatus for data disaster tolerance preprocessing and a Service Control Point (SCP).

BACKGROUND OF THE INVENTION

With the continuous development of intelligent network services, the coloring ring back tone service is applied more and more widely and gradually becomes one basic service operated by operators. At present, users not only have increasing demands for the individualization of a coloring ring back tone system, but also raise higher requirements on the stability of the whole system. Therefore, in order to guarantee the stability of the system, a data disaster tolerance mechanism is raised. The process of data disaster tolerance is to synchronize important data of users to other places (for example, a disaster tolerance database) in a certain approach or way, when the normally used database cannot be used due to abnormality, the service can be switched to the disaster tolerance database in time, so that users can use the service normally without being influenced, or the influence range may be reduced maximally.

FIG. 1 illustrates a structure of the coloring ring back tone service according to the related art. As shown in FIG. 1, the structure of the existing coloring ring back tone service is that one Service Management Point (SMP) manages a plurality of SCPs, and simultaneously each SCP is separately configured with a disaster tolerance machine to realize the data disaster tolerance. When data change, the data in an official database is kept consistent to that in the disaster tolerance database by means of writing synchronization tables or sending messages, however, the above two ways have their own shortcomings: the way of synchronization tables is unable to keep the official database consistent to the disaster tolerance database in real time, and the way of sending messages is easy to lose data, and both ways have disadvantages of instability, low efficiency and complex mechanism, therefore the complexity and the implementation difficulty of the system are increased. Further more, in an environment with a plurality of SCPs, separately configuring a disaster tolerance machine for each SCP greatly increases the cost.

In allusion to problems that the cost is high as each SCP is configured with a separate disaster tolerance machine to establish the disaster tolerance database of this SCP, the data synchronization way is complex, and the stability is low, no effective solution has been proposed at present.

SUMMARY OF THE INVENTION

The present invention is proposed aiming at problems that the cost is high as each SCP is configured with a separate disaster tolerance machine, the data synchronization is not in real time, and the stability is low, therefore, the present invention provides a method and an apparatus for data disaster tolerance preprocessing and an SCP, used in each SCP of a plurality of SCPs with databases, so as to solve at least one of the above problems.

To realize the above purpose, according to one aspect of the present invention, a method for data disaster tolerance preprocessing is provided, comprising: a first database is set in a first SCP, wherein the first database is used to perform disaster tolerance backup for a second database in a second SCP.

To realize the above purpose, according to another aspect of the present invention, an apparatus for data disaster tolerance preprocessing is provided, comprising: an establishment module, configured to set a first database in a first SCP, wherein the first database is used to perform disaster tolerance backup for a second database in a second SCP.

To realize the above purpose, according to still another aspect of the present invention, an SCP is provided, comprising: a first database, configured to perform disaster tolerance backup for a second database in another SCP.

Through the present invention, by establishing a disaster tolerance database used for disaster tolerance backup in another SCP (the first SCP) for an official database (the second database) of a certain SCP (the second SCP), the problem that the cost is high as each SCP is configured with a separate disaster tolerance machine as its disaster tolerance database in the related art is solved, thus the cost of the construction of the system is reduced.

Other features and advantages of the present invention will be described in the following description, and, will be partially apparent from the description or understood from the implementation of the present invention. Purposes and other advantages of the present invention may be implemented and obtained through the structures specially pointed out in the description, claims and drawings.

BRIEF DESCRIPTION OF THE DRAWINGS

Drawings described herein are provided for further understanding of the present invention and form one part of the application, exemplary embodiments of the present invention and description thereof are used for explaining the present invention and form no improper limit to the present invention. In the drawings.

DETAILED DESCRIPTION OF THE EMBODIMENTS

The present invention will be described in details below with reference to drawings and embodiments. It should be noted that embodiments in the application and features in the embodiments may be combined with each other if there is no conflicted.

Method Embodiments

Figure 1:
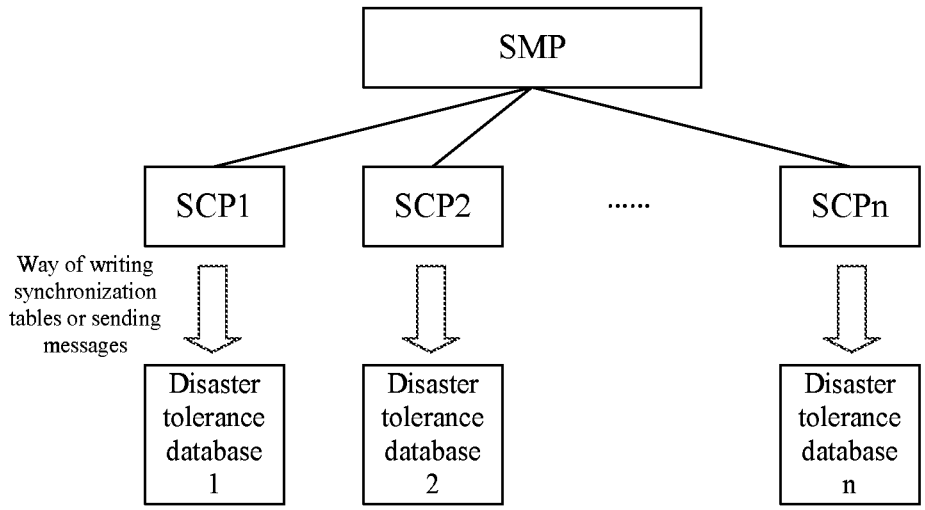
FIG. 1 illustrates a structure block diagram of the coloring ring back tone service according to the related art.
Figure 2:
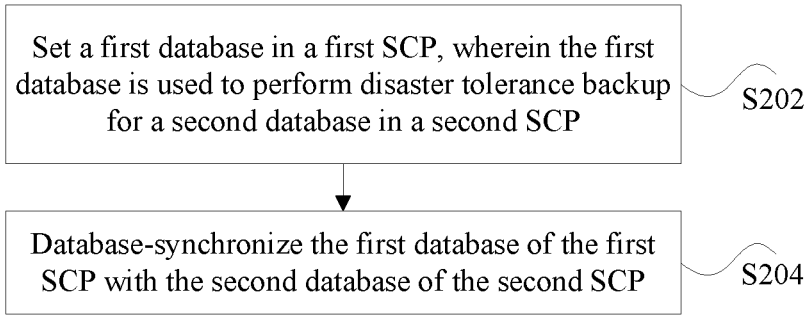
FIG. 2 illustrates a flow chart of a method for data disaster tolerance preprocessing according to an embodiment of the present invention.

According to an embodiment of the present invention, a method for data disaster tolerance preprocessing is provided. FIG. 2 illustrates a flow chart of a method for data disaster tolerance preprocessing according to an embodiment of the present invention, as shown in FIG. 2, the method comprises the following steps S202-S204.

S202: A first database is set in a first SCP, wherein the first database is used to perform disaster tolerance backup for a second database in a second SCP.

Obviously, the first SCP is any SCP, and the second SCP is any SCP other than the first SCP. The first database may be called as a disaster tolerance database of an official database (i.e., primary database) of the second SCP. The first SCP and the second SCP may belong to one SMP.

In the related art, it is necessary to separately configure one disaster tolerance machine for each SCP as the disaster tolerance database of this SCP, thus the problem of high cost exists. In the embodiment, as the disaster tolerance database is established for this SCP in another SCP in a plurality of existed SCPs, thus other existed SCP equipment are utilized, it is unnecessary to configure a separate disaster tolerance machine for this SCP as the disaster tolerance database, therefore the cost of the construction of the system can be reduced.

During practical application, the above process comprises: multiple SCPs with databases (i.e., official databases) are divided into a plurality of SCP groups, wherein each SCP group in the plurality of SCP groups comprises two SCPs, respectively being the first SCP and the second SCP; and the disaster tolerance database of the database of the first SCP is established in the second SCP, and the disaster tolerance database of the database of the second SCP is established in the first SCP. In a case that the number of the plurality of SCPs is an odd number N, the process of dividing the plurality of SCPs into a plurality of SCP groups comprises: a certain SCP in the plurality of SCPs is logically divided into two SCPs, and the N+1 SCPs after the division are divided into (N+1)/2 SCP groups, wherein each SCP group in the (N+1)/2 SCP groups comprises two SCPs, respectively being the first SCP and the second SCP, and the first SCP and the second SCP are not the two SCPs logically divided from the divided SCP (that is, the two SCPs logically divided from this SCP cannot be in one same SCP group).

S204: The first database (disaster tolerance database) of the first SCP is database-synchronized with the second database of the second SCP.

Preferably, the first database (disaster tolerance database) of the first SCP can be database-synchronized with the second database of the second SCP through an oracle advanced replication.

Preferably, the step that the first database of the first SCP is database-synchronized with the second database of the second SCP through the oracle advanced replication comprises: the second database creates a materialized view log for a local data table needing disaster tolerance backup; the first database creates a database link, wherein a destination database of the database link is the second database of the second SCP; the first database creates a materialized view according to the database link, wherein the materialized view corresponds to the materialized view log one to one; the materialized view regularly reads the update information in the corresponding materialized view log and performs data synchronization according to the update information.

In the preferable embodiment, the oracle advanced replication is employed to realize the specific implementation of database-synchronization between the official database of the SCP and the disaster tolerance database thereof. The employment of the oracle advanced replication mechanism can perform data synchronization in real time and enhance the stability and feasibility of the disaster tolerance system, thus the problems in the related art that the data synchronization is not in real time and the stability thereof is low are solved.

Preferably, before the materialized view regularly reads the update information in the corresponding materialized view log and performs data synchronization according to the update information, the method further comprises: the first database creates a refresh group and sets a time interval for the refresh group, wherein the refresh group comprises a plurality of materialized views; and the step that the materialized view regularly reads the update information in the corresponding materialized view log and performs data synchronization according to the update information comprises: the plurality of materialized views in the refresh group read the update information in the corresponding materialized view log according to the time interval, and the update information is an operation log for operating the data table corresponding to the materialized view log; the plurality of materialized views operate according to the read operation log to realize data synchronization. In this way, by establishing a refresh group, the uniform management of the materialized views can be performed, thus the efficiency of data synchronization is improved.

Figure 3:
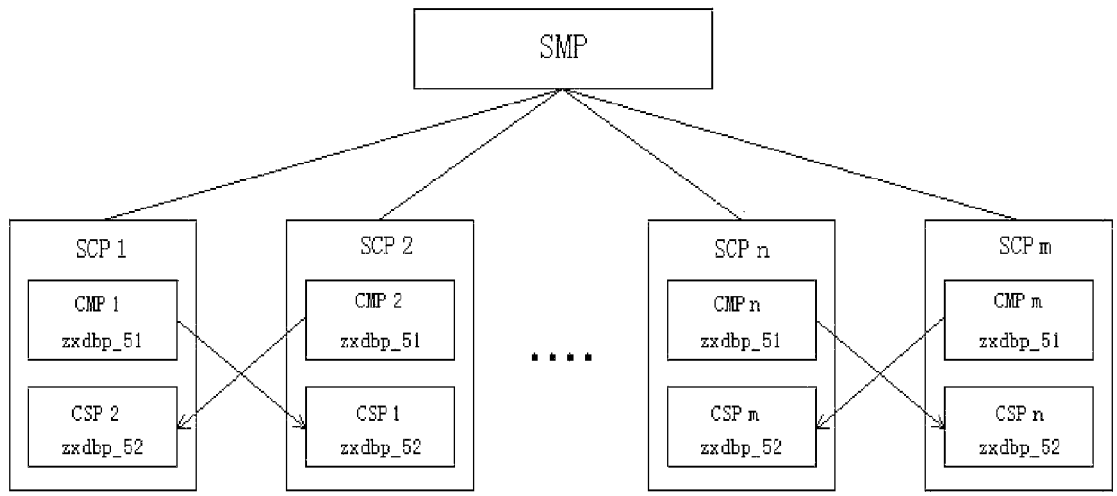
FIG. 3 illustrates a structure block diagram of the coloring ring back tone service applying the method for data disaster tolerance preprocessing according to an embodiment of the present invention.

During practical implementation, a specific processing flow chart of the method for data disaster tolerance preprocessing according to an embodiment of the present invention is as shown in FIG. 3. FIG. 3 illustrates a structure block diagram of the coloring ring back tone service applying the method for data disaster tolerance preprocessing according to an embodiment of the present invention, the method for data disaster tolerance preprocessing provided in the embodiment of the present invention will be described with reference to FIG. 3, the method mainly comprises the steps as follows.

S1: An environment with even number times of SCPs is established, and two SCPs form one group.

S2: One of the groups is taken as an example (SCP1-SCP2), and official databases (zxdbp_51 user), i.e., the foregoing databases, are established in the SCPs in the group. Corresponding to the conception in the oracle, the above process is to establish coloring ring back tone service databases (zxdbp_51 user) on the main points (i.e., Compositive Management Platform, CMP), specifically, SCP1 and SCP2 respectively correspond to CMP1 and CMP2, an official database (zxdbp_51 user) is established in the SCP1 or CMP1, and an official database (zxdbp_51 user) is established in the SCP2 or CMP2. Further, the CMP stores all information of respective user, creates service table structure, data management storage process and service call process, processes management and call function of all data, and loads the management service logic and the call service logic. The CMP point creates the coloring ring back tone service environment, including database, table, index, storage process and loading of service logic or the like, the environment created by the CMP point is the same as the traditional coloring ring back tone environment, the environment can be created according to the existing flows and will not be described again herein.

S3: Disaster tolerance databases (zxdbp_52) are established in the relative machines which are paired. Corresponding to the conception in the oracle, the above process is to establish disaster tolerance databases (zxdbp_52 user) of the coloring ring back tone service databases in the replication point (i.e., Call Service Platform, CSP), specifically, a disaster tolerance database (zxdbp_52 user) of the official database of SCP2 is established in the SCP1 or CSP1 point, a disaster tolerance database (zxdbp_52 user) of the official database of SCP1 is established in the SCP2 or CSP2 point, at this time, it is only needed to create one clear user (empty database). The disaster tolerance database in the CSP point is only responsible for call links of users. In the present disaster tolerance environment, one CMP corresponds to only one CSP. The CSP separately loads the call service logic and does not process the management data of users, user tables are unnecessary to be established in advance, and, it is only needed to establish a database user, sort out tables and fields related to calls of users, and directly synchronize data related to calls from the CMP.

S4: Make sure that the well installed database system supports the oracle advanced replication. Materialized view logs (mvlog) are created in two CMP points (i.e., CMP1 and CMP2), and the data is synchronized according to the mvlog by the disaster tolerance databases. First, tables related to calls in the system are filtered, and one materialized view log is established for each table. The database system automatically records the log of operating the table each time and synchronizes the log to a data call management platform CSP point at a set time.

S5: The CSP point creates a database link (dblink). When a database link is created, it is necessary to point out the address of the CMP corresponding to the CSP point and the user name of the synchronized database, the CMP point corresponding to the CSP point means the CMP in the SCP which is related to the SCP corresponding to this CSP, that is, the dblink configured for the CSP1 corresponding to the SCP1 is the CMP2 corresponding to the SCP2, and the dblink configured for the CSP2 corresponding to the SCP2 is the CMP2 corresponding to the SCP1.

S6: The CSP points create materialized views (my) and indexes according to respective database (disaster tolerance databases herein) links. The my in the CSP point corresponds to mvlog in the CMP point corresponding to the CSP point one to one. These tables for which my and mvlog are established are data related to calls, in this way, the synchronized backup of user call data is realized. When the CSP point creates mvlog, first, it is necessary to determine all the data used by calls, and my is established for tables corresponding to these data and linked to the CMP.

S7: The CSP point creates a refresh group and points out a refresh interval. A plurality of mvs may form one refresh group to perform uniform management.

S8: After the oracle advanced replication mechanism (the CMP point establishes mvlog, and the CSP point establishes my, refresh group and link to the CMP) is established, the storage process used for calls can be compiled and relative services are activated (also, services are started), to perform normal number allocation and data maintenance in the CMP and treatments such as having a call, and the corresponding CSP disaster tolerance database also can synchronously perform disaster tolerance processing for data. It should be noted that the CSP does not change data actively, and it only accepts data changed by the CMP.

The data disaster tolerance function can be realized after the above operations are completed. As shown in FIG. 2, suppose that when the official database (zxdbp_51) of the SCP1 cannot be used normally due to abnormality, the call service is switched to the disaster tolerance database (zxdbp_52) of the SCP2 immediately, the user may be free of influence on the normal calling procedure. After the failure is solved, the service is switched back to the zxdbp_51 of the SCP1.

The above method utilizes the advanced database replication function of the oracle, during the use, attention should be paid to that the network link between respective machines must be kept unblocked, otherwise synchronization backlog may be caused. If the synchronization of these tables is failed as DDL are operated on tables established with my in the CMP, these tables can be repaired by reestablishing my in the CSP.

It should be noted that, the application of the above method is not limited to a case in which the SCP is a service control point, the above method can be applied in various SCPs with databases, and the data disaster tolerance preprocessing principle is also approximately the same and will not be described again herein.

Apparatus Embodiments

Figure 4:
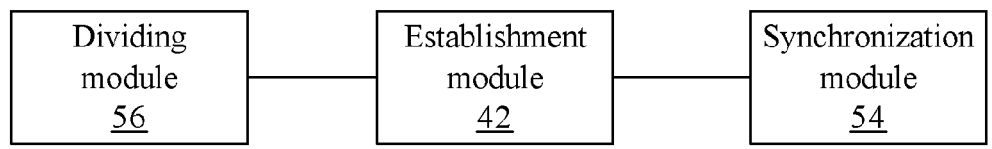
FIG. 4 illustrates a structure block diagram of an apparatus for data disaster tolerance preprocessing according to an embodiment of the present invention.

According to an embodiment of the present invention, an apparatus for data disaster tolerance preprocessing is provided, and the apparatus is used for implementing the method for data disaster tolerance preprocessing described in the method embodiments. FIG. 4 illustrates a structure block diagram of an apparatus for data disaster tolerance preprocessing according to an embodiment of the present invention, as shown in FIG. 4, the apparatus comprises: an establishment module 42, configured to set a first database in a first SCP, wherein the first database is used to perform disaster tolerance backup for a second database in a second SCP.

Preferably, the apparatus may also comprise: a dividing module 56, configured to divide the plurality of SCPs into a plurality of SCP groups, wherein each SCP group in the plurality of SCP groups comprises two SCPs, respectively being the first SCP and the second SCP.

Preferably, the apparatus may also comprise: a synchronization module 54, configured to database-synchronize the first database of the first SCP with the second database of the second SCP through an oracle advanced replication.

Figure 5:
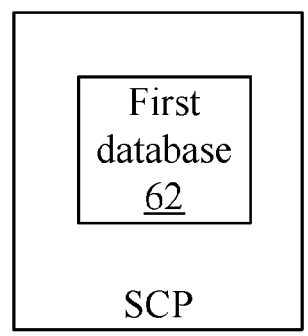
FIG. 5 illustrates a structure block diagram of an SCP according to an embodiment of the present invention.

FIG. 5 illustrates a structure block diagram of an SCP according to an embodiment of the present invention, the SCP comprises: a first database 62, configured to perform disaster tolerance backup for a second database in another SCP.

The first database (may be called as a disaster tolerance database of the second database in another SCP) in the SCP is data-synchronized with the second database by using the method for data disaster tolerance preprocessing in the above embodiment.

In conclusion, the solution provided in the embodiments of the present invention will integrate a disaster tolerance machine which bears the disaster tolerance database and the SCP, the implementation of disaster tolerance is simplified, and the cost of the disaster tolerance system is reduced; on the other hand, in the solution, data related to calls are synchronized to the CSP disaster tolerance database through the oracle advanced replication function, compared with the ways of synchronization tables and messages, the implementation method is simple, the stability and feasibility of the disaster tolerance are improved, it is unnecessary to pay a lot of effort on the consistency of data, thus the implementation difficulty of the disaster tolerance system is decreased, and the data disaster tolerance is likely to be popularized vigorously.

It should be noted that, steps shown in the flow charts in the drawings may be executed in a computer system such as a group of computer executable instructions; furthermore, although the logic sequence is shown in the flows, in some cases, the shown or described steps may be executed in a sequence different from the sequence herein.

Of course, those skilled in the art should understand that the above modules or steps of the present invention could be achieved through general calculating devices, they can be concentrated in a single calculating device or distributed in a network formed by multiple calculating devices, optionally, they can be achieved by program codes that can be executed by calculating devices, thus, they can be stored in storage devices to be executed by calculating devices, or they can be achieved by respectively making them into many integrated circuit modules or by making multiple modules or steps among them into a single integrated circuit module. In this way, the present invention is not limited to combinations of any specific hardware and software.

Above contents are only preferable embodiments of the present invention and are not used for limiting the present invention. For those skilled in the art, the present invention may have various alternations and changes. Any modifications, equivalent replacements and improvements within the spirit and principle of the present invention should be contained within the protection scope of the present invention.

What is claimed is:

1. A method for data disaster tolerance preprocessing, comprising:
    setting a first database in a first Service Control Point (SCP), wherein the first database is used to perform disaster tolerance backup for a second database in a second SCP;
    after the step of setting the first database in the first SCP, the method further comprising: database-synchronizing the first database of the first SCP with the second database of the second SCP through an oracle advanced replication, wherein the step of database-synchronizing the first database of the first SCP with the second database of the second SCP through the oracle advanced replication comprises: the second database creating a materialized view log for a local data table needing disaster tolerance backup; the first database creating a database link, wherein a destination database of the database link is the second database of the second SCP; the first database creating a materialized view according to the database link, wherein the materialized view corresponds to the materialized view log one to one; and the materialized view regularly reading update information in the corresponding materialized view log and performing data synchronization according to the update information.

2. The method according to claim 1, wherein the first SCP and the second SCP belong to a same Service Management Point (SMP).

3. The method according to claim 1, wherein the SMP manages a plurality of SCPs, before the step of setting, in the first SCP, the first database which is used to perform disaster tolerance backup for the second database in the second SCP, the method further comprises:
    dividing the plurality of SCPs into a plurality of SCP groups, wherein each SCP group in the plurality of SCP groups comprises two SCPs, respectively being the first SCP and the second SCP.

4. The method according to claim 3, wherein when the number of the plurality of SCPs is an odd number N, the step of diving the plurality of SCPs into the plurality of SCP groups comprises:
    logically dividing one SCP of the plurality of SCPs into two logical SCPs, and dividing the N−1 SCPs and the two logical SCPs after the division into (N+1)/2 SCP groups, wherein each SCP group in the (N+1)/2 SCP groups comprises two SCPs, or one SCP and one logical SCP, respectively being the first SCP and the second SCP, and the two logical SCPs logically divided from the divided SCP belong to different SCP groups.

5. The method according to claim 1, wherein before the step of the materialized view regularly reading the update information in the corresponding materialized view log and performing data synchronization according to the update information, the method further comprises: the first database creating a refresh group and setting a time interval for the refresh group, wherein the refresh group comprises a plurality of materialized views; and
    the step of the materialized view regularly reading the update information in the corresponding materialized view log and performing data synchronization according to the update information comprises: the plurality of materialized views in the refresh group reading the update information in the corresponding materialized view logs according to the time interval, wherein the update information is an operation log for operating the data table corresponding to the materialized view log; the plurality of materialized views operating according to the read operation log to realize data synchronization.

6. An apparatus for data disaster tolerance preprocessing, comprising: a processor coupled to a memory, configured to execute an establishment module and a synchronization module, wherein
    the establishment module is configured to set a first database in a first Service Control Point (SCP), wherein the first database is used to perform disaster tolerance backup for a second database in a second SCP; and
    the synchronization module is configured to database-synchronize the first database of the first SCP with the second database of the second SCP through an oracle advanced replication, wherein the oracle advanced replication is implemented by the second database creating a materialized view log for a local data table needing disaster tolerance backup; the first database creating a database link, wherein a destination database of the database link is the second database of the second SCP; the first database creating a materialized view according to the database link, wherein the materialized view corresponds to the materialized view log one to one; and the materialized view regularly reading update information in the corresponding materialized view log and performing data synchronization according to the update information.

7. The apparatus according to claim 6, wherein the processor is further configured to execute a dividing module, and wherein
    the dividing module is configured to divide a plurality of SCPs into a plurality of SCP groups, wherein each SCP group in the plurality of SCP groups comprises two SCPs, respectively being the first SCP and the second SCP.

8. A Service Control Point (SCP), comprising: a processor coupled to a memory, configured to set a first database in the first SCP, wherein the first database is configured to perform disaster tolerance backup for a second database in another SCP; further configured to database-synchronize the first database of the SCP with a second database of another SCP through an oracle advanced replication, wherein the oracle advanced replication is implemented by the second database creating a materialized view log for a local data table needing disaster tolerance backup; the first database creating a database link, wherein a destination database of the database link is the second database of the second SCP the second SCP; the first database creating a materialized view according to the database link, wherein the materialized view corresponds to the materialized view log one to one; and the materialized view regularly reading update information in the corresponding materialized view log and performing data synchronization according to the update information.

* * * * *